United States Patent Office 3,028,391
Patented Apr. 3, 1962

3,028,391
1-ALKYL-3-(α-PHENYL-4-PYRIDYLMETHYL)
UREAS AND THIOUREAS
Kurt J. Rorig, Glenview, Ill., assignor to G. D. Searle & Co., Chicago, Ill., a corporation of Delaware
No Drawing. Filed Mar. 30, 1960, Ser. No. 18,519
4 Claims. (Cl. 260—294.8)

This invention relates to 1-alkyl-3-(α-phenyl-4-pyridylmethyl)ureas and thioureas, and processes for the manufacture thereof. More particularly, this invention relates to chemical compounds of the formula

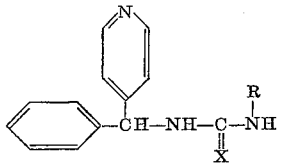

wherein R represents an alkyl radical and X represents oxygen or sulfur.

Among the alkyl radicals represented by R, especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ groupings wherein $n$ represents a positive integer amounting to less than 9.

The compounds to which this invention relates are useful because of their valuable pharmacological properties. Specifically, they are selective diuretic agents singularly adapted to increase the output of urinary sodium. They also stimulate the central nervous system.

Manufacture of the subject compounds proceeds by heating 4-(α-aminobenzyl)pyridine with an appropriate isocyanate or isothiocyanate of the formula

RNCX

R and X being defined as before and the process being carried out in an inert solvent such as benzene.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

1-isopropyl - 3 - (α-phenyl-4-pyridylmethyl)thiourea.—
A solution of 13 parts of 4-(α-aminobenzyl)pyridine monohydrate in 400 parts of benzene is heated at the boiling point under reflux, a trap being provided to remove the water azeotropically distilled. When water no longer separates, 7 parts of isopropyl isothiocyanate is introduced; and heating at the boiling point under reflux is resumed for 5½ hours. Excess isopropyl isothiocyanate is destroyed by the introduction of 4 parts of ethanol 5 minutes prior to termination of the heating period. The product is precipitated from the reaction mixture by addition of 180 parts of petroleum ether boiling in the range 60–71°. The 1 - isopropyl - 3 - (α-phenyl-4-pyridylmethyl)thiourea thus obtained, collected on a filter and recrystallized from a mixture of ethyl acetate and cyclohexane, melts at 147–149°. It has the formula

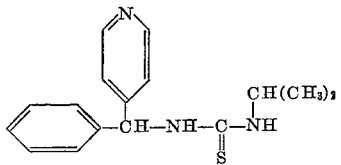

*Example 2*

1-ethyl-3-(α-phenyl-4-pyridylmethyl)urea. — Using the technique of Example 1, but substituting 5 parts of ethyl isocyanate for the 7 parts of isopropyl isothiocyanate called for therein, one obtains 1-ethyl-3-(α-phenyl-4-pyridylmethyl)urea, which melts at 142.5–144.5° when recrystallized from ethyl acetate. The product has the formula

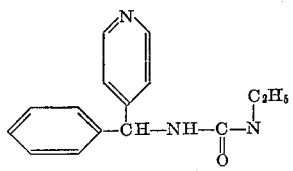

*Example 3*

1-isopropyl-3-(α-phenyl - 4 - pyridylmethyl)urea.—Using the technique of Example 1, but substituting 6 parts of isopropyl isocyanate for the 7 parts of isopropyl isothiocyanate called for therein, one obtains 1-isopropyl-3-(α-phenyl-4-pyridylmethyl)urea, of the formula

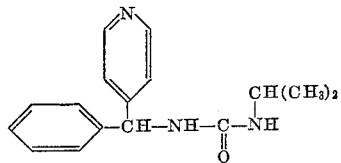

What is claimed is:
1. A compound of the formula

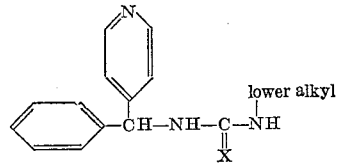

wherein X represents a member of the group consisting of oxygen and sulfur.
2. A compound of the formula

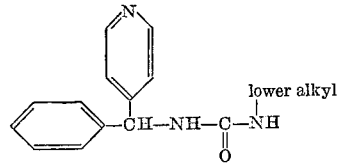

3. 1-ethyl-3-(α-phenyl-4-pyridylmethyl)urea.
4. 1-isopropyl-3-(α-phenyl-4-pyridylmethyl)thiourea.

References Cited in the file of this patent

UNITED STATES PATENTS 2,802,008    Burtner _____ Aug. 6, 1957